United States Patent [19]

Ocker

[11] 4,107,787
[45] Aug. 15, 1978

[54] SCREW EXTRUDER FOR CONTINUOUSLY PROCESSING AND DEGASING OF ELASTOMERS AND POLYMERS HAVING A VISCOSITY OF MORE THAN 1,000 POISE

[75] Inventor: Herbert Ocker, Leonberg, Fed. Rep. of Germany

[73] Assignee: Werner & Pfleiderer, Stuttgart, Fed. Rep. of Germany

[21] Appl. No.: 778,943

[22] Filed: Mar. 18, 1977

[30] Foreign Application Priority Data

Mar. 26, 1976 [DE] Fed. Rep. of Germany ....... 2612827

[51] Int. Cl.² .............................................. B29B 1/10
[52] U.S. Cl. ................................... 366/75; 159/2 E; 264/102; 366/84
[58] Field of Search ................................ 259/191–193; 159/2 E; 264/102; 425/203, 204, 208; 366/75

[56] References Cited

U.S. PATENT DOCUMENTS

| 2,639,464 | 5/1953 | Magerkurth ........................ 259/191 |
| 2,662,243 | 12/1953 | Schnuck et al. .................... 259/191 |
| 3,170,190 | 2/1965 | Fields ............................. 159/2 E X |
| 3,764,114 | 10/1973 | Ocker ............................. 259/192 X |

FOREIGN PATENT DOCUMENTS 1,103,897 2/1968 United Kingdom .................... 425/203

Primary Examiner—Philip R. Coe
Attorney, Agent, or Firm—Hane, Roberts, Spiecens & Cohen

[57] ABSTRACT

A screw extruder for continuously processing and degasing elastomers and polymers having a viscosity of more than 1,000 poise comprising a casing with an input zone at one end and a discharge zone at the other, several degasing zones within the casing along the length thereof and a pressure zone upstream of each degasing zone. The inside wall portions juxtaposed to the degasing zones include spiral grooves having at the most the same depth as the flights of the extruder screws.

10 Claims, 5 Drawing Figures

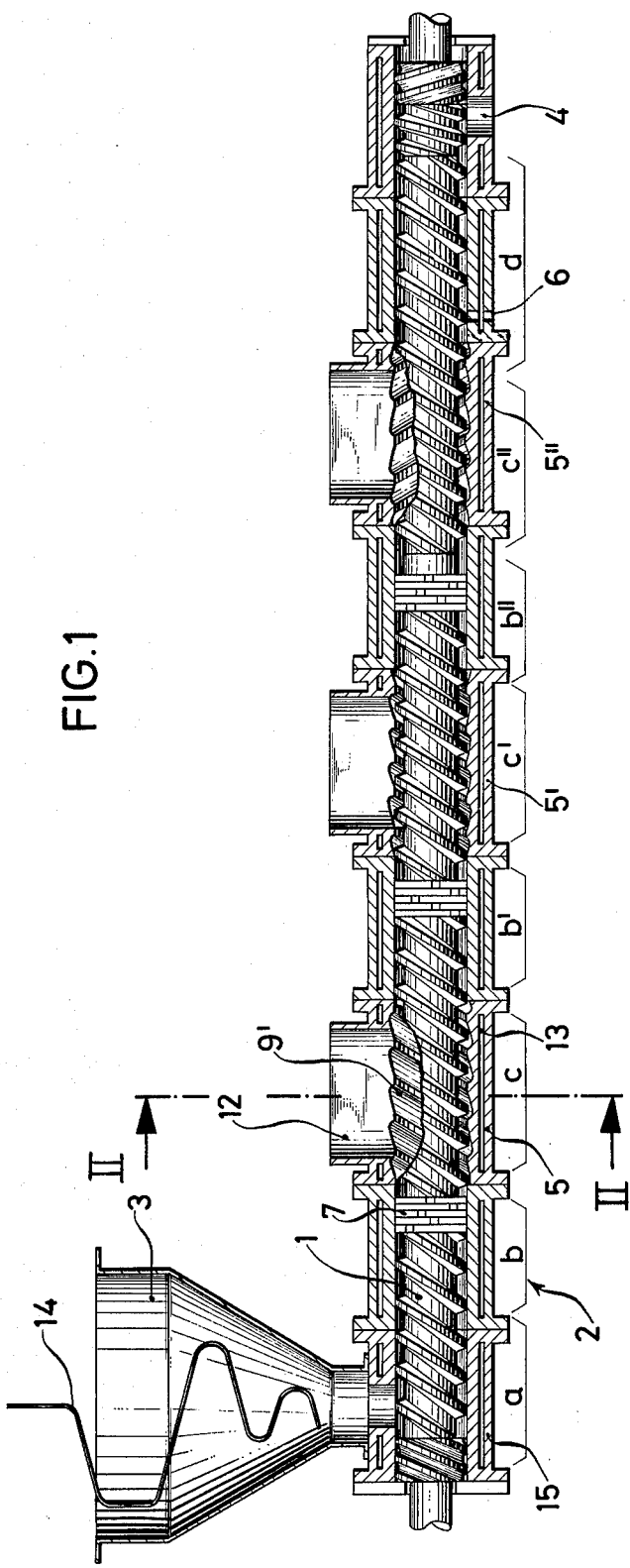
FIG.1
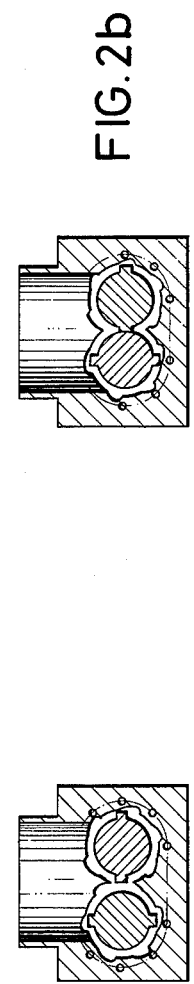
FIG.2a
FIG.2b

SCREW EXTRUDER FOR CONTINUOUSLY PROCESSING AND DEGASING OF ELASTOMERS AND POLYMERS HAVING A VISCOSITY OF MORE THAN 1,000 POISE

FIELD OF THE INVENTION

The invention relates to a screw extruder for continuously processing and degasing elastomers and polymers having a viscosity of more than 1,000 poise and more particularly, to a screw extruder with a casing in which either a single screw or twin screws rotatable in opposite direction are mounted. The casing has an inner cylindrical space with a grooved wall profile and is provided at one end with an input zone and at the other end with an output zone. Between these two end zones are degasing zones and upstream of each degasing zone are provided back pressure or flow restraining means.

BACKGROUND OF THE INVENTION

The processing of polymer and elastomer melts in screw extruders is preceded by stirring in a container equipped with suitable agitators or in autoclaves to effect polymerization. With the processing of the material solvents and/or not reacted monomers are reduced to the required residual percentage by degasing and application of heat. The temperature conditions present in the degasing range and also the surface conditions of the melt are of substantial significance.

The purging of the solvent, or the monomer in the melt requires frequently steps which have a damaging effect upon the quality of the melt to be processed; particularly when the end product has to be brought to a very low residual content of such volatile components. As apparent, a minimal percentage of residual components of volatile substances is of great importance for the quality of the end product.

The demand made by industry on the aforereferred to processed materials and especially with respect to highly impact-resistant or tough products is rapidly increasing. To satisfy the demand, it was already necessary, in addition to providing several degasing zones when used in continuously operating screw extruders, to feed in steam or inert gas within the range of the last degasing zone upstream of the discharge zone of the extruder. However, it has been found that such process steps are, in many instances, not sufficient to obtain an acceptable degasing of highly impact-resistant synthetic plastic melts. This is particularly the case when it is important that the process can be carried out at economically acceptable costs when it is demanded that the end product have a residual content of less than 0.5% of volatile components. In any event, when the output of synthetic plastic melts has to be increased the aforementioned low percentage of volatile components is difficult to maintain.

U.S. Pat. No. 2,595,455 describes a screw extruder for processing and degasing thermoplastic material. The extruder according to the patent provides within the range of the input or feed-in zone a flow restraining or drag zone in the form of a cylindric bore having within the restraining zone ribs or thread-shaped protrusions. The purpose of such restraining zone is within its working reach an increase of the mixing and shearing effect acting upon the synthetic plastic material to be processed to obtain a loosening of the material. However, it has been found that such increased mixing and shearing forces have no useful effect in the subsequent degasing zone. As a result, the screw extruder arrangement according to the patent does not produce an economically adequate increase of the output capacity of the extruder. It has also been found that the inherently developing additional temperature raise as caused by friction in the pressure zone of the extruder the thermal load acting upon the melt of synthetic plastics material is correspondingly increased.

THE INVENTION

It is a broad object of the invention to provide a novel and improved screw extruder which favorably increases the effect of degasing zones, such as vacuum type degasing zones, even if the feed-in of material into the extruder is considerably increased.

Another object of the invention is to provide a novel and improved screw extruder with which the residual percentage of solvents or monomers is lowered to less than 0.5% in the melt after processing the same.

SUMMARY OF THE INVENTION

The afore-pointed out objects, features and advantages and other objects, features and advantages which will be pointed out hereinafter are obtained by providing a spiral groove with a selected pitch on the inside wall of a degasing zone within the extruder casing which is disposed downstream of kneading and shearing elements. This profiled zone is so arranged that the depths of the grooves in the profiled casing zone is selected so that it is equal or smaller than the depth of the flights or threads of the screw or screws of the extruder.

According to another aspect of the invention, the base of the spiral groove has a semi-spherical configuration. As a result, in the degasing or vacuum zone a large exposed surface of the melt is obtained relative to the exposed surface in the feed-in zone or in a kneading or shearing zone. Such enlarged exposed surface has an advantageous effect upon the heat transfer between the casing wall and the melt and also improves the degasing action in degasing zones to a considerable extent. Increase of heat transfer by a maximal surface area capable of transferring heat in the degasing zones compensates for the loss of volatilization heat as occurs in the degasing zone. As a result, the fed-in thermal energy is better utilized and the thermal preservation of the synthetic plastic melt is improved.

The enlarged surface area on the inside wall of the casing as is obtained by the afore-described formation of grooves makes possible a better distribution of the melt so that the vacuum as it is used in the degasing zones can extend itself into the upstream range of the inner wall of the casing. As a result, the shear strain to which the material is subjected in such zone is reduced to a minimum so that if necessary or desirable an increase of the output of the extruder can be obtained by increased rotational speed of the screws.

According to a preferred embodiment of the invention, the spiral grooves are provided on a part which is detachably secured to the inner wall of the casing of the extruder within the range of one or more degasing zones. As a result, the profiled groove can be readily shaped so as to be the most suitable one for the specific melt to be processed. Moreover, profiles of different depths or pitch can be readily used in different degasing zones as it is most advantageous for a specific processing operation. It is further possible to exchange casing sections in a very simple manner. According to another aspect of the invention, such simple exchange is obtained by providing casing wall sections consisting of a part of the actual casing wall and a bushing releasably attached thereto and secured against rotation relative to the casing part. In such arrangement the spiral grooves are provided on the inside of the bushing.

To make possible an exchange of components also with twin screw extruders, the invention provides that the outer cross-sectional outline of the bushing is formed by two semi-circular parts, the centers of which are located coaxially with the lengthwise axis of the extruder casing spaces for twin screws. These semi-circular spaces are joined by two flat surfaces.

In all arrangements according to the invention to exchange components, for instance due to wear and tear or to change the inner profile of the bushing, it is merely necessary to pull the bushing out of the extruder casing proper and to replace it by a bushing of suitable configuration.

According to another aspect of the invention, the effect of the shear action in the degasing zones to reduce the pitch of the spiral groove of several successive degasing zones has the same angular orientation as the pitch of the flights or gangs on the screws. Such equal angular orientation eliminates the danger of a local overheating, especially within the degasing zones which are followed by a pressure build-up zone.

An increase of the dwell time for an optimal degasing effect in the last stage or zone is obtained when, as described hereinafter, the pitch of the spiral groove in the last downstream degasing zone is directed in opposition to the angular pitch orientation of the screw flights or threads. Within the range of this zone it is particularly advantageous to feed-in a flow retaining or drag medium.

According to still another aspect of the invention, there are provided several spiral grooves with equal and/or opposite pitch angle. Such disposition of the pitch angles adaptation to the viscosity of the melt thereby further increasing the exposed surface of the molten material. Moreover, the afore-described selection of the pitch permits optimal processing of a range of material reaching from highly impact-resistant material to paste-type products and reduces the heretofore particularly strong shear action effect.

BRIEF DESCRIPTION OF THE DRAWING

In the accompanying drawing, two preferred embodiments of the invention are shown by way of illustration and not by way of limitation.

Figure 3:
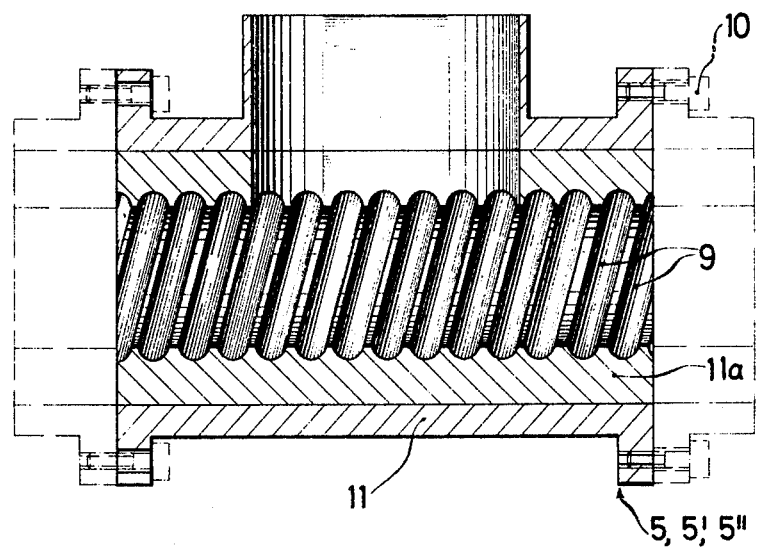
Figure 4:
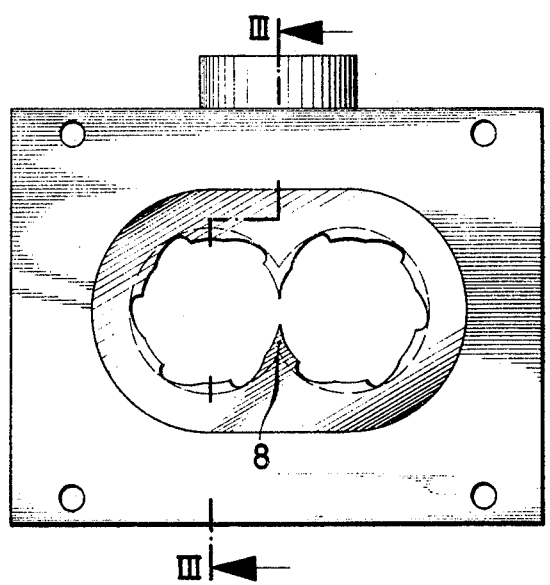

IN THE DRAWING:

FIG. 1 is a lengthwise section of a screw extruder according to the invention;

FIG. 2a is a section taken along line II — II in FIG. 1, showing the screw extruder as a twin screw extruder with two screws in tangential relationship;

FIG. 2b is a similar section showing a twin screw extruder with the two screws in engaging relationship;

FIG. 3 is a section taken on line III — III in FIG. 4; and

FIG. 4 is a view seen from an end in FIG. 3.

DETAILED DESCRIPTION OF THE DRAWING

Referring now to the Figures in detail, the exemplified embodiments of the invention show a screw extruder with twin screws 1 disposed in parallel relationship. However, the concept of the invention is also applyable to screw extruders having a single screw. The screws are disposed in a casing 2 which will be more fully described hereinafter. The lefthand end of the extruder is the input end or zone. A general conventional feeding device comprises a hopper 3 within which is provided a spiral 14 to facilitate the inflow of material into the extruder. The other end of the extruder constitutes the discharge zone and is provided with a discharge opening 4. The discharge opening may also be equipped with additional treating means. Such additional treating means are not shown and should be taken as being conventional and may also be provided with guide means such as spiral winding 14.

The casing 2 consists of several successively arranged sections 15 which may include ducts 13 for circulating a heating medium. The casing sections in conjunction with the rotary screws constitute several processing stages. These processing stages include, as seen in the downstream direction, a feed-in zone $a$, a pressure zone $b$, a first degasing zone $c$, a further pressure zone $b'$, a second degasing zone $c'$, a further pressure zone $b''$, a third degasing zone $c''$, and finally a discharging zone $d$. An opening 6 serves for supply to the melt material of a substance for reducing the purging of solvents in the material, e.g. steam. The opening 6 is shown in communication with the last degasing zone $c''$. This has the advantage that residual solvents can be easily removed in the form of vapors at the discharge opening 4. The melt fed into the extruder reaches the degasing zones after having been freed of tension. For this purpose there is provided upstream of each degasing zone kneading and shearing means 7 which are at the downstream end of the respective pressure zone.

The casing sections 5, 5' and 5" which are aligned with the degasing zones are provided with outlet openings 12 and are arranged in the receiving bores or spaces for the screws 1. There are provided in the wedge region 8 inner profiles defined by one or several spiral grooves 9. The pitch angle has generally the same orientation or direction as the screw flight pitch within the same range. Degasing is effected via openings 12 by vacuum means of conventional design (not shown). It is advantageous to arrange the pitch angle of the spiral grooves 9 at the casing section 5", that is, the casing section including the last degasing zone $c''$, with oppositely directed pitch angle. As a result, the degasing in this section effects an enlarged dwell time of the melt. Moreover, the pitch angle of the spiral groove 9 within the casing sections 5, 5' and 5" has to be selected depending upon the desirable dwell time and the physical characteristics of the material to be processed. These considerations also apply for the precise determination of the depths of the spiral grooves.

It has been found that for certain synthetic plastic melts, the processes described in the following examples are particularly advantageous:

EXAMPLE I

For processing and degasing of a polybutadiene solution with a melt viscosity of 50,000 poise at 160° C. processing temperature fed into the casing zones of a twin screw extruder, an extruder with engaging screw flights and a screw diameter of D = 89 mm was used.

The length of one degasing zone was about 3D.

The average pitch of the spiral groove in the degasing zones for the melt was preferably within the range of 60 to 160 mm.

The axial width of the groove at the two-gang profile of the used spiral groove was preferably within the range between 25 and 74 mm. The depth of the spiral groove corresponded to the depth of the screw flights and was about 6.0 mm.

The melt output was about 300 kg/h.

EXAMPLE 2

For processing and degasing of impact-resistant polystyrol with a melt viscosity of 6,000 poise at about 270° C. processing temperature, a twin extruder with engaging screw flights was used.

The input of the melt was 460 kg/h.

The configurations of the screws and of the spiral grooves in the degasing zones had the following data:

Diameter of screws: 83 mm (D)
Length of a degasing zone: About 3D

Pitch of the spiral groove in the casing was preferably in the range between 45 to 120 mm.

The axial width of the groove for the used 3-gang profile was preferably in the range between 14 to 37 mm.

The depth of the gangs was about three-fourths of the depths of the gangs in the screws and was at about 5 mm.

In both afore-described examples the presence of residual monomers was reduced to less than 0.5%.

As it appears from FIGS. 3 and 4, the casing sections 5, 5' and 5" provided with spiral grooves 9 are constructed of casing portions 11 held together by fastening means 10. A bushing 11a is fitted into each casing section constituting part of a degasing zone so that they cannot turn relative to the sections. Each bushing may be secured to the respective casing section by a pressure fit so that it can be replaced if necessary. Other fastening means can, of course, also be used.

When twin screw extruders are used, the bushing and also the fitted casing portion consists, as shown, of two semi-circular portions and also a generally rectangular portion.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications as defined in the appended claims.

What is claimed is:

1. A screw extruder for continuously processing and degasing elastomers and polymers having a viscosity of more than thousand poise, said screw extruder comprising:
   an elongate casing defining a lengthwise inner space and having at one end an input zone and at the other end a discharge zone;
   at least one extruder screw having flights along its length rotatably mounted in said casing along the length thereof,
   degasing zones lengthwise spaced within said casing space between said input and discharge zones;
   pressure means in the space within the casing and disposed upstream of each of said degasing zones;
   kneading and shear means disposed upstream of each of said degasing zones;
   said casing having in its inside wall juxtaposed to the degasing zones and limited in length by the kneading and shear means a plurality of spirally grooved portions, one portion for each degasing zone, each portion having a plurality of spiral grooves, the pitch and the depth of said spiral grooves being at most equal to the depth of the flights on the extruder screw, the spiral grooves of each portion extending along the entire length of the respective degasing zone.

2. The screw extruder according to claim 1 wherein said spiral groove portions have a semi-spherical cross-sectional configuration.

3. The screw extruder according to claim 1 wherein the pitch angle of the spiral groove portions juxtaposed to several successive degasing zones has the same angular orientation as the flights of the extruder screw.

4. The screw extruder according to claim 3 wherein the direction of the pitch angle of the spiral groove portion juxtaposed to the last degasing zone in the downstream direction is in opposition to the pitch angle direction of the flights of the extruder screw.

5. The screw extruder according to claim 3 wherein several spiral groove portions have pitch angles in the same angle direction.

6. The screw extruder according to claim 3 wherein several spiral groove portions have pitch angles in opposite directions.

7. The screw extruder according to claim 1 wherein each degasing zone has an outlet opening for released gas, said spiral grooves in each degasing zone traversing said outlet opening beyond the ends thereof to extend the entire length of the degasing zone.

8. The screw extruder according to claim 1 wherein said casing comprises a plurality of juxtaposed detachably connected wall sections.

9. The screw extruder according to claim 8 wherein selected of said casing wall sections correspond to said degasing zones and each comprises a bushing having an inner surface with said spiral grooves formed therein, and a wall section, said bushing being mounted within said wall section and secured against rotation in said wall section.

10. The screw extruder according to claim 9 and comprising a second extruder screw mounted in said casing and rotatable in opposition to the first extruder screw, said bushing having an outer peripheral outline in transverse cross-section of said bushing defined by two semi-circular portions each having its center coaxial with the center axis of the respective extruder screw and by two plane bushing sections joining said semi-circular portions.

* * * * *